United States Patent [19]

Gritton

[11] 4,426,729

[45] Jan. 17, 1984

[54] PARTIAL BAND - WHOLE BAND ENERGY DISCRIMINATOR

[75] Inventor: Charles W. K. Gritton, North Brunswick, N.J.

[73] Assignee: Bell Telephone Laboratories, Incorporated, Murray Hill, N.J.

[21] Appl. No.: 240,978

[22] Filed: Mar. 5, 1981

[51] Int. Cl.³ .................................................. G10L 1/00
[52] U.S. Cl. ................................. 381/41; 179/84 VF; 179/170.2; 324/77 R
[58] Field of Search ................ 179/1 P, 1 MN, 1 VC, 179/84 VF, 170.2, 170.6, 170.8; 324/77 R, 77 B, 77 H; 364/724; 381/56, 58, 71, 94, 110

[56] References Cited

U.S. PATENT DOCUMENTS

| | | | |
|---|---|---|---|
| 2,974,281 | 3/1961 | Feldman | 324/77 H |
| 3,499,999 | 3/1970 | Sondhi | 179/170.2 |
| 3,500,000 | 3/1970 | Kelly et al. | 179/170.2 |
| 3,927,259 | 12/1975 | Brown | 179/1 MN |
| 4,028,496 | 8/1976 | La Marche et al. | 179/1 P |
| 4,028,506 | 6/1977 | Araseki et al. | 179/170.2 |
| 4,129,753 | 12/1978 | Duttweiler | 179/170.2 |
| 4,275,270 | 6/1981 | de la Plaza | 179/1 P |
| 4,277,645 | 7/1981 | May, Jr. | 179/1 P |

OTHER PUBLICATIONS

D. Duttweiler; IEEE Spectrum; "Bell's Echo-Killer Chip"; Oct. 1980; pp. 34–37.
J. Otterman; Ire Transactions on Automatic Control; "The Properties and Methods for Computation of Exponentially-Mapped-Past Statistical Variables"; Jan. 1960; pp. 11–17.

*Primary Examiner*—G. Z. Rubinson
*Assistant Examiner*—Randall P. Myers
*Attorney, Agent, or Firm*—Thomas Stafford

[57] ABSTRACT

Energy in a received signal is distinguished as being whole band energy or partial band energy by comparing an average value of the received signal to a modified magnitude value of the received signal. A signal representative of the comparison result is supplied to a filter including hysteresis for generating a signal to control representative of whether whole band or partial band energy is present. Hysteresis is provided in generation of the control signal by comparing the output amplitude of the filter to a first threshold value when the control signal is a first state and then comparing the filter output amplitude to a second lower threshold value when the control signal is a second state. When the modified magnitude value exceeds the average value, the received signal includes whole band energy, otherwise the received signal includes only partial band energy. In one example, this technique is employed in an echo canceler to enable updating an echo path estimate during intervals that the received signal includes whole band energy and to inhibit updating of the echo estimate being generating when the received signal includes only partial band energy.

7 Claims, 4 Drawing Figures

PARTIAL BAND - WHOLE BAND ENERGY DISCRIMINATOR

RELATED APPLICATIONS

Copending applications Ser. No. 240,977 and Ser. No. 240,979 were filed concurrently herewith.

TECHNICAL FIELD

This invention relates to energy discrimination and, more particularly, to distinguishing when a received signal includes partial band energy or whole band energy.

BACKGROUND OF THE INVENTION

A partial band-whole band energy discriminator as disclosed in copending U.S. patent application Ser. No. 240,977 filed concurrently herewith is employed to inhibit updating of an adaptive filter employed in an echo canceler during intervals that partial band energy is detected in a received signal. The received energy is discriminated as being partial band or whole band and the echo canceler is enabled to adjust an echo estimate being generated only when whole band energy is being received. That is to say, the echo estimate is enabled to be adjusted during intervals that significant far end energy is being received and the energy is determined not to be partial band and, therefore, is defined as being whole band. The apparatus employed to discriminate between partial band and whole band energy as disclosed in the application Ser. No. 240,977 is sophisticated and presently would require a substantial area of an integrated chip, if not several chips.

In another energy discriminator as disclosed in U.S. patent application Ser. No. 240,979 filed concurrently herewith whole band energy and partial band energy in a received far end signal are distinguished by comparing a signal representative of an average value of the received signal to a signal representative of a modified magnitude value of the received signal. When the modified magnitude of the received signal exceeds the average value, the received signal includes whole band energy and updating of the echo estimate is enabled for at least a predetermined interval. When the modified magnitude does not exceed the average, the received signal includes only partial band energy and updating of the echo estimate is inhibited.

This arrangement uses an initial interval wait timer to protect against falsely indicating detection of whole band energy until the circuit stabilizes and a socalled hangover timer to generate a control signal for enabling the echo canceler updating for at least a predetermined interval. It has been determined that use of such techniques somewhat limits over all performance in distinguishing between whole band and partial band energy. Indeed, once the hangover timer times-out the control signal changes state and updating of the echo estimate is immediately inhibited.

SUMMARY OF THE INVENTION

These and other problems are overcome in an energy discriminator of the type employing a comparison of prescribed amplitude characteristics of a received signal for distinguishing whether the received signal includes whole band energy or only partial band energy by employing a filter having a prescribed characteristic to filter a signal representative of the result of the comparison for generating a control signal indicative of the type energy being received. An output signal from the filter is compared to a predetermined threshold value and when the filter output signal amplitude value is less than the threshold value, a control signal state is generated which indicates that the received signal includes only partial band energy and not whole band energy. Hysteresis is incorporated into the control signal generating process by employing a first predetermined threshold value to compare the filter output signal amplitude value against when the control signal is a first state which indicates the received signal does not include whole band energy and a second predetermined threshold value to compare the filter output signal against when the control signal is in a second state which indicates the received signal includes whole band energy. In one embodiment, the first threshold value is greater than and in prescribed relationship to the second threshold value. Simply stated, a first state of the control signal is generated until the filter output signal amplitude value is equal to or greater than the first threshold value and, then, a second state of the control signal is generated until the filter output signal amplitude value is less than the second threshold value.

BRIEF DESCRIPTION OF THE DRAWING

The invention will be more fully understood from the following detailed description of an illustrative embodiment taken in connection with the appended figures in which.

DETAILED DESCRIPTION

Figure 1:
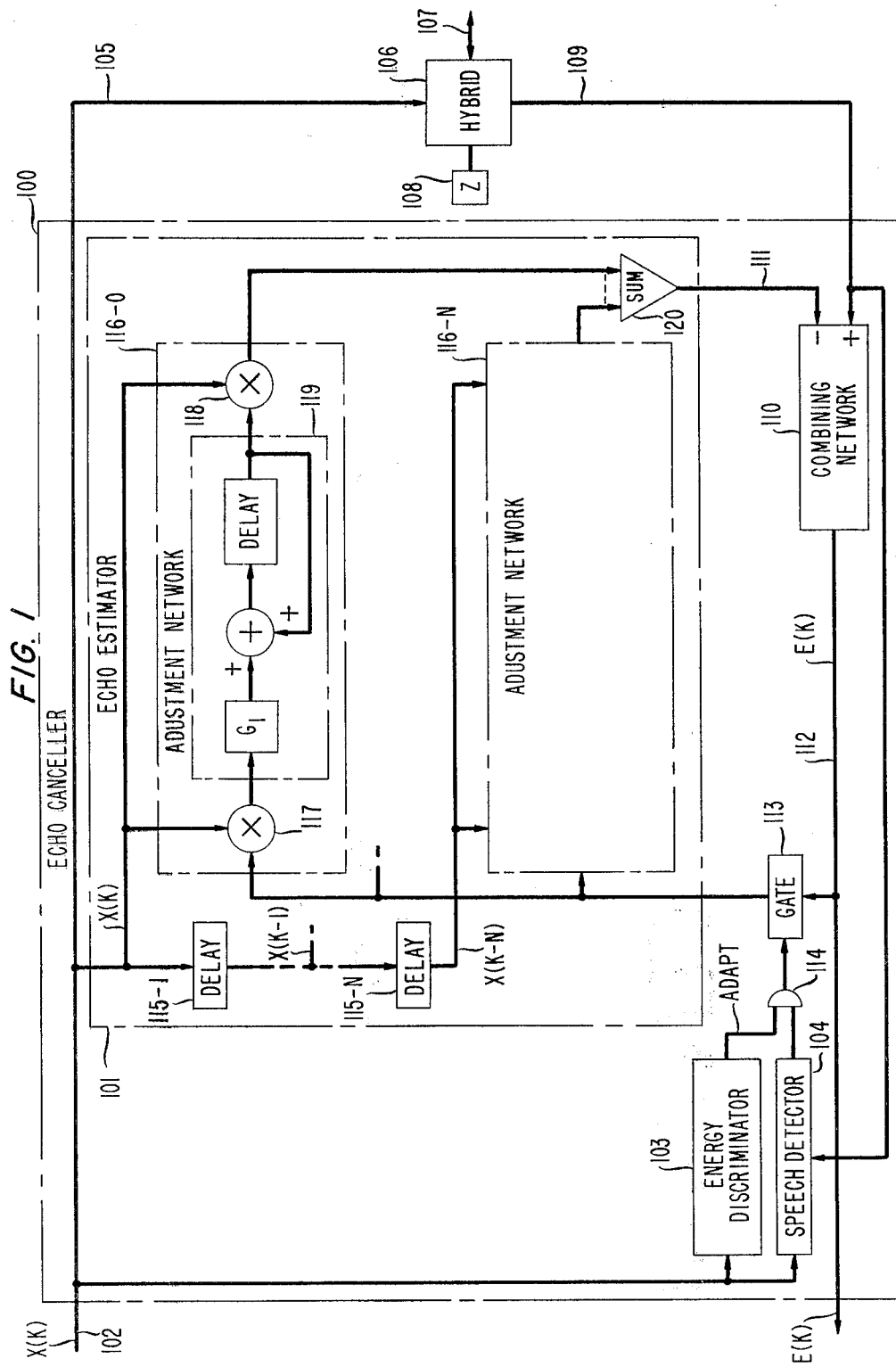
FIG. 1 shows in simplified block diagram form an echo canceler including an embodiment of the invention.

Echo canceler 100 including an embodiment of the invention is shown in simplified block diagram form in FIG. 1. Echo canceler 100 is broadly similar to echo cancelers disclosed in U.S. Pat. Nos. 3,499,999 and 3,500,000. Also see an article entitled "Bell's Echo-Killer Chip", *IEEE Spectrum*, October, 1980, pages 34–37. However, unlike prior echo canceler arrangements, canceler 100 includes energy discriminator 103 for controllably enabling updating of an echo signal estimate, when a far end signal received over a first transmission path includes a certain class of signals including so-called whole band energy. Stated another way, updating of the echo signal estimate is inhibited when the far end signal includes significant energy which is only partial band. Broadly, in one embodiment of the invention an average magnitude of the received signal is compared to a modified magnitude of the received signal and if the modified magnitude is greater than the average, the received signal is considered to include whole band energy. If so, the updating or adapting of the echo signal estimate is enabled. Otherwise, updating of the echo estimate is inhibited. This enables the echo canceler adapting to a transfer function only when the received signal includes whole band energy and inhibits updating the transfer function when only partial band energy is being received, which would result in possible low return loss for other frequency components in the frequency band of interest e.g., the voice frequency band. Consequently, unwanted oscillations and other problems in the transmission network are avoided. Improved performance is realized, in accordance with an aspect of the invention, by filtering the result of the average to modified magnitude comparison to generate the control signal. Use of a filter having a prescribed characteristic including hysteresis minimizes the effect of errors in the comparison on the decision of whether whole band energy or partial band energy is being received. This also allows the comparison threshold to be lowered, yielding improved performance on detecting whole band energy without deteriorating performance on detecting partial band energy.

Briefly, canceler 100 includes an adjustable signal processor having a closed loop error control system which is self-adapting in that it automatically tracks signal variation in an outgoing path. More specifically, canceler 100 employs echo estimator 101 including a transversal filter arrangement for synthesizing a linear approximation of the echo, i.e., an echo estimate.

To this end, far end incoming signal X(K) is usually supplied from a far end talking party over a first transmission path, e.g., lead 102, to a first input of echo canceler 100 and therein to an input of echo estimator 101, an input of energy discriminator 103 and a first input of speech detector 104. Far end signal X(K) may be, for example, a digitally sampled speech signal, where K is an integer identifying the sampling interval. In a specific example, X(K) includes 8 bit digital code words. One such code in common case is the μ-law code used in pulse code modulated (PCM) speech transmission systems having an 8 kilo Hertz sampling rate. Far end signal X(K) is also supplied via lead 105, perhaps through some conversion circuitry, e.g., a digital-to-analog converter not shown, to a first input of hybrid 106. It is usually desirable for the input signal to hybrid 106 from lead 105 to be supplied over bidirectional path 107 to a near listening party. However, because of an impedance mismatch in hybrid 106, typically caused by balance impedance 108 not exactly matching the impedance of bidirectional path 107 a portion of the hybrid input signal appears on outgoing lead 109 and is reflected to the far end signal source as an echo. The echo is supplied from an output of hybrid 106 over lead 109 to a second input of canceler 100 and therein to a second input of speech detector 104, and a first input of combining network 110. Lead 109 may also include conversion apparatus, e.g., an analog-to-digital converter not shown. A second input to combining network 110 is a signal estimate of the echo generated by echo estimator 101. The echo estimate is supplied via lead 111 from an output of echo estimator 101 to the second input of combining network 110. Combining network 110 generates error signal E(K) corresponding to the algebraic difference between the echo estimate and the output from hybrid 109 including the undesirable echo. Error signal E(K) is supplied over a second transmission path, e.g., lead 112 to the far end source and to controllable switching gate 113. Gate 113 is controlled to be enabled or inhibited by an output signal from AND gate 114. A first state of the output from AND gate 114, e.g., a logical 1 enables gate 114 to supply error signal E(K) to estimator 101 while a second state of the output from AND gate 114, e.g., a logical O inhibits gate 114 from supplying error signal E(K) to estimator 111.

Heretofore, gate 113 was controlled to inhibit supplying error signal E(K) to estimator 101 when significant far end energy was not present, when near end speech was present or when a prescribed relationship between error signal E(K), far end signal X(K) and a status signal indicates the presence of near end speech signals as described in U.S. Pat. No. 4,129,753. As indicated above far end signal X(K) could include speech, noise, any of a number of individual tones, multifrequency tones or the like. Thus, in prior arrangements error signal E(K) was only inhibited when no significant far end energy was detected or when near end speech was detected. On the other hand, error signal E(K) was supplied to estimator 101 during intervals that significant far end energy in signal X(K) was detected. This energy could be partial band energy, i.e., a single frequency tone, multifrequency tones or the like. Consequently, estimator 101 was allowed to adapt or otherwise be adjusted during the intervals that only partial band energy was being received. As indicated above such an adjustment results in undesirable results. Specifically, the transfer function to which estimator 101 may adjust to for the frequency components of the partial band signal would possibly result in a low return loss for other frequency components in the frequency band of interest. This, in turn, may cause unwanted oscillations in the communications circuits. The undesirable oscillations and other problems arise from allowing estimator 101 to be adjusted when partial band energy is present are avoided by employing energy discriminator 103 to distinguish whether far end signal X(K) includes only partial band energy or whole band energy. If it is determined that X(K) is not whole band energy, e.g., speech or noise, or stated another way, if X(K) is partial band energy, e.g., a single frequency tone, multifrequency tones or the like, discriminator 103 generates an output which inhibits AND gate 114. On the other hand, when whole band energy is detected, discriminator 103 generates an output which enables AND gate 114. AND gate 114, in turn, generates a control signal for controlling gate 113 and, hence, the supply of E(K) to estimator 101. Specifically, a first state of the control signal from gate 114, e.g., a logical 1 enables gate 113 while a second state of the control signal, e.g., a logical 0 inhibits gate 113. Consequently, the echo estimate generated by estimator 101 remains constant during intervals that only partial band energy is present and an undesirable adjustment of the canceler transfer function is avoided.

Estimator 101 includes a so-called tapped delay line comprised of delay units 115-1 through 115-N for realizing desired delays at the taps corresponding to convenient Nyquist intervals. Therefore, delayed replicas X(K-1) through X(K-N) of incoming far end signal X(K) are generated at the corresponding taps. The signal at each tap position, namely X(K-1) through X(K-N) as well as X(K), is adjusted in response to error signal E(K). More particularly, signals X(K) through X(K-N) are individually weighted in response to E(K) via a corresponding one of adjustment networks 116-0 through 116-N, respectively. Adjustment networks 116-0 through 116-N each include multipliers 117 and 118, and feedback loop 119. Feedback loop 119 adjusts the tap weight to a desired value in a manner which will be apparent to those skilled in the art and explained in the above-noted references. The weighted replicas of X(K) from adjustment networks 116-0 through 116-N are summed via summing network 120 to generate the echo estimate signal approximating the echo to be cancelled. The echo estimate is supplied via lead 111 to the second input of combining network 110.

Figure 2:
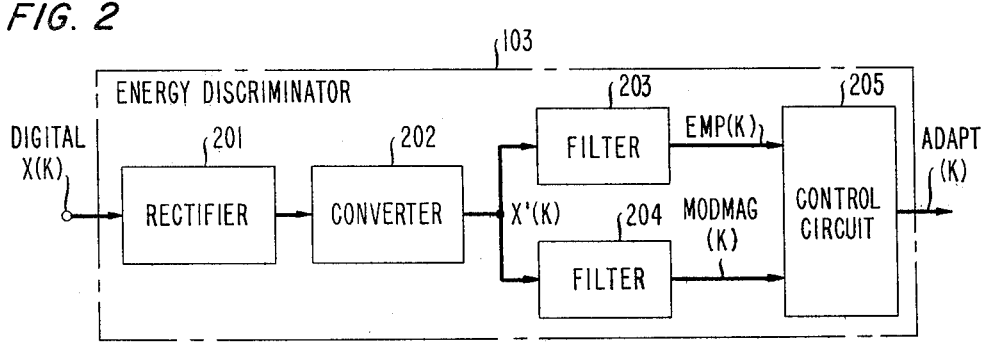
FIG. 2 depicts in simplified form details of the energy discriminator employed in FIG. 1.

FIG. 2 shows in simplified block diagram form one embodiment of energy discriminator 103 which may be utilized, in accordance with an aspect of the invention, to determine whether significant energy in received signal X(K) is whole band and, hence, not only partial band. In this example not to be construed as limiting the scope of the invention, the frequency band of interest is the telephone voice frequency band of approximately 300 Hz to 4000 Hz. Whole band energy is, for example, speech, Gaussian noise or the like, i.e., signals having frequency components across the whole frequency band. Partial band energy is, for example, single frequency tones, multifrequency tones or the like, i.e., signals having frequency components in relatively narrow frequency portions of the frequency band of interest.

Accordingly, received signal X(K) is supplied to rectifier 201. Any one of a number of precision full wave rectifiers known in the art may be employed for this purpose. If X(K) is a digital signal, for example, representative of a $\mu$-law sample, the rectification is achieved by dropping the sign bit. The rectified $\mu$-law sample is converted to linear form via digital converter 202. The conversion to linear form provides improved overall performance.

Rectified version X'(K) of X(K) is supplied to first filter 203 and to second filter 204. Filters 203 and 204 are employed to obtain prescribed characteristics of received signal X(K) in order to distinguish whether X(K) includes whole band energy or only partial band energy. In this example, filter 203 is used to obtain a short term running average value of X'(K), i.e., EMP(K), while filter 204 is used to obtain a modified magnitude of X'(K), i.e., MOD MAG(K). To this end, filter 203 is a digital low pass filter having a first prescribed time constant while filter 204 has a second prescribed time constant. Since filter 204 in this example generates MOD MAG(K) in accordance with a prescribed criterion, the second time constant is zero and filter 204 is essentially an attenuator. In this example, MOD MAG(K) is approximately 10 dB less than X'(K), i.e., MOD MAG(K)=X'(K)−10 dB. This is realized in this example by dividing X(K) by three (3). Consequently, the comparison threshold is lowered as compared to that employed in the discriminator disclosed in the application Ser. No. 240,979 noted above.

Filter 203 generates essentially the running average of X'(K) and has a short time constant, illustratively on the order of 16 milliseconds. Specifically, filter 203 is a low pass digital filter (not shown) having a prescribed characteristic to generate an exponentially mapped past (EMP(K)) version of X'(K). It is noted that other filter characteristics may be equally employed to obtain EMP(K) OF X'(K). A variety of arrangements and techniques may be employed for generating the short term running average of signal X'(K). As indicated above, one technique is to obtain the exponentially mapped past (EMP) of the signal. EMP averaging is particularly useful in control or detection situations where interest is directed at the recent past behavior of a process and is described in *IRE Transactions on Automatic Control*, Vol. AC-5, January 1960, pages 11–17. The EMP average of a sequence of samples is determined by weighting the recent samples more heavily than the less recent samples. The relative weighting of a digital signal is, for example, a geometric function. In a specific example, digital filter 203 generates $$EMP(K+1)=(1-\alpha)EMP(K)+\alpha X'(K) \qquad (1)$$

where $\alpha=1/128$ and K is the currently generated sample. Another example of a digital averaging circuit employing EMP is described in U.S. Pat. No. 4,028,496.

Both signal EMP(K) and signal MOD MAG(K) are supplied to control circuit 205 for generating in accordance with prescribed criteria signal ADAPT(K). Signal ADAPT(K) in this example is employed to control enabling and disabling AND gate 113 (FIG. 1) and, hence, enabling and disabling updating of the echo estimate, i.e., impulse response being generated by echo estimator 101 (FIG. 1). Specifically, when ADAPT(K) is a first state, e.g., a logical 0, signal X(K) includes partial band energy and when ADAPT(K) is a second state, e.g., a logical 1, signal X(K) includes whole band energy.

Figure 3:
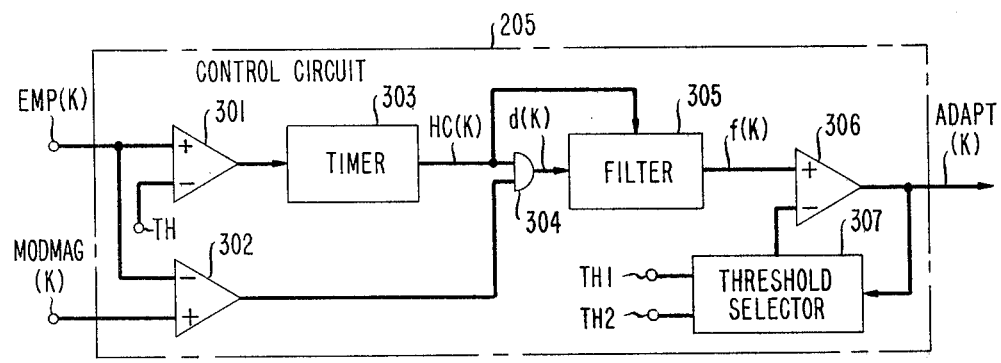
FIG. 3 shows details of the control circuit employed in the discriminator of FIG. 2.

FIG. 3 shows details of control circuit 205. Accordingly, EMP(K) is supplied to a first input of digital comparators 301 and 302. MOD MAG(K) is supplied to a second input of comparator 302 while threshold signal TH is supplied to a second input of comparator 301. Comparator 301 is employed to detect whether received signal X(K) includes significant far end energy. Thus, if EMP(K) exceeds a predetermined threshold TH, X(K) is assumed to include significant energy. In this example, TH is 16 of a 4079.5 full scale linear range. An output from comparator 301 is supplied to timer 303. Timer 303 is employed to determine whether the significant far end energy is present for at least a first predetermined interval $T_1$. In this example, timer 303 provides a wait interval of $T_1=24$ milliseconds. This is achieved by counting 192 8-kHz frames to generate HC(K)=1, otherwise HC(K)=0. This is to protect against erroneously generating ADAPT(K)=1 during the initial interval of received signal X(K) when transients may be present. Output HC(K) from timer 303 is supplied to a first input of AND gate 304. Thus, AND gate 304 is disabled until EMP(K) is greater than TH for interval $T_1$.

Comparator 302 compares MOD MAG(K) to EMP(K) on a sample by sample basis. When MOD MAG(K) is greater than EMP(K) comparator 302 generates a logical 1 output. For speech, i.e., whole band energy, MOD MAG(K) should be greater than EMP(K) approximately once every pitch period. An output from comparator 302 is supplied to a second input of AND gate 304. Thus, AND gate 304, when enabled via HC(K)=1, supplies a logical 1-0 pattern d(K) representative of the result of the EMP(K) to MOD MAG(K) comparison to digital filter 305.

Digital low pass filter 305 is used, in accordance with an aspect of the invention, so that the comparison threshold between EMP and X'(K) can be lowered thereby improving performance in detecting when whole band energy is being received. This is possible because some wrong EMP to MOD MAG decisions can be made without affecting the decision to generate ADAPT(K)=1 because of the filter function. Filter 305 generates digital output f(K) which is supplied to one input of digital comparator 306. Details of filter 305 are shown in FIG. 4 and described below.

Comparator 306 in conjunction with threshold selector 307 provides, in accordance with an aspect of the invention, hysteresis in the decision to generate the first and second states of control signal ADAPT(K). Specifically, threshold selector 307 is responsive to a first state of ADAPT(K), namely, ADAPT(K)=1, to supply a first predetermined threshold TH1 to a second input of comparator 306 and to a second state of ADAPT(K), namely, ADAPT(K)=0, to supply a second predetermined threshold TH2 to the second input of comparator 306. The threshold values are selected in relationship to scaling factor F of d(K) in filter 305 as described below. In one example, F is selected to be 512 and TH1 is selected to be 4F=2048 while TH2 is selected to be 2F=1024. Thus, it is seen that hysteresis is provided in the generation of ADAPT(K). Specifically, since TH1 is 4F=2048, f(k) must exceed this higher value before ADAPT=1 is generated. This allows for some errors in the EMP to MOD MAG comparison because of transients and the like without prematurely generating ADAPT=1 and allowing updating of the echo estimate on an improper signal. Also, since TH2 is selected to be 2F=1024, once ADAPT=1 is generated, it will be maintained until f(K) drops below the lower threshold TH1. This provides hysteresis in the generation of ADAPT=1. Consequently, the ADAPT=1 condition, once generated, remains for an interval significantly longer than with the use of a hangover timer as disclosed in the patent application Ser. No. 240,979 noted above. Consequently, ADAPT=1 is maintained longer without returning to the ADAPT=0 condition and thereby causing the updating of the echo estimated to be inhibited less often.

Figure 4:
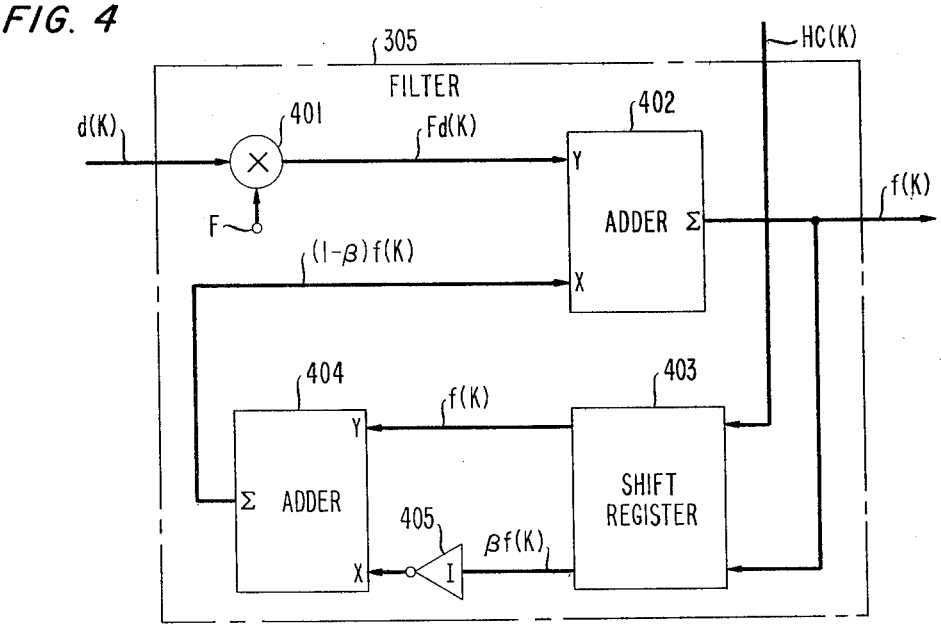
FIG. 4 depicts in simplified form details of the filter employed in the control circuit of FIG. 3.

FIG. 4 shows in simplified form details of digital filter 305. For clarity of description timing signals have not been shown. In this example, serial bit flow is assumed, although the filter can equally be implemented employing parallel bit flow. Digital filter 305 is a low pass digital filter and is enabled via signal HC(K) being a logical 1 to filter signal d(K) according to $$f(K+1)=(1-\beta)f(K)+\beta d(k) \quad (2)$$

where $\beta=1/512$ and K is the currently generated sample. When HC(K) is a logical 0

$$f(K+1)=f(K) \quad (3)$$

Accordingly, output d(K) from AND gate 304 (FIG. 3) is supplied to one input of multiplier 401 while scaling factor F is supplied to a second input to generate scaled version Fd(K) of d(K). Scaling factor F is a number selected so that f(K) is an integer and still has a desired precision. In experimental practice, the scaling function is realized by approximately timing of d(K) until a desired value is obtained, for example, F=512. Signal Fd(K) is supplied to a first input of adder 402 while a signal representative of $(1-\beta)f(K)$ is supplied to a second input. An output of adder 402 is current sample f(K) and, then, the next sample output is f(K+1). Signal f(K) is supplied to shift register 403. When enabled via HC(K)=1, shift register 403 generates $\beta f(K)$ at one output and f(K) at another output. The number of stages in shift register 403 is selected to realize $\beta$, in this example, $\beta=1/512$. When HC(K)=0 shift register 403 is inhibited. Signal $\beta f(K)$ is supplied via inverter 405 to a first input of ADDER 404 while signal f(K) is supplied to a second input. ADDER 404 generates a signal representative of $(1-\beta)f(K)$ which is supplied to the second input of ADDER 402.

Although the invention is described as being employed in an echo canceler, it can equally be used with other adaptive filters or in any application in which the type of the received energy must be classified as either partial band or whole band.

What is claimed is:

1. An energy discriminator of the type for discriminating between whole band energy and partial band energy in a received signal in a prescribed frequency band and for generating a control signal indicative thereof including, means for generating a first signal representative of an average value of the received signal, means for generating a second signal representative of a magnitude of the received signal, and first means for comparing said first and second signals to generate an output signal having a first state when said second signal is equal to or greater than said first signal and a second state when said second signal is less than said first signal, characterized by, low pass filter means having a prescribed characteristic for generating a filtered signal version of said first comparing means output signal, and second means for comparing said filtered signal to at least one predetermined threshold value to generate a first state of the control signal indicative that whole band energy is not being received when said first filtered signal amplitude value is less than said at least one threshold value and a second state of the control signal indicative that whole band energy is being received when said filtered signal amplitude value is equal to or greater than said at least one threshold value.

2. An energy discriminator of the type for discriminating between whole band energy and partial band energy in a received signal in a prescribed frequency band and for generating a control signal indicative thereof including, means for generating a first signal representative of an average value of the received signal, means for generating a second signal representative of a magnitude of the received signal, and first means for comparing said first and second signals to generate an output signal having a first state when said second signal is equal to or greater than said first signal and a second state when said second signal is less than said first signal, characterized by, low pass filter means having a prescribed characteristic for generating a filtered signal version of said first comparing means output signal, and means responsive to said filtered signal for generating a first state of said control signal indicative that partial band energy is being received until an amplitude of said filtered signal is equal to or greater than a first threshold value and then generating a second state of the control signal indicative that whole band energy is being received until the amplitude of said filtered signal is less than a second threshold value.

3. An energy discriminator as defined in claim 2 wherein said first threshold value is greater than said second threshold value.

4. An energy discriminator as defined in claim 2 wherein said control signal generating means includes means having an input and an output and being responsive to said control signal for generating at said output said first threshold value when the control signal is said first state and for generating at said output said second threshold value when the control signal is said second state and second means for comparing said filtered signal to an output from said first and second threshold values generating means.

5. An energy discriminator as defined in claim 4 wherein said low pass filter means comprises a digital low pass filter including means for scaling by a predetermined factor said first comparing means output signal and wherein said first threshold value is greater than and in prescribed relationship to said second threshold value.

6. An energy discriminator as defined in claim 5 wherein said first threshold value is in first predetermined relationship to said scaling factor and said second threshold value is in second predetermined relationship to said scaling factor.

7. An energy discriminator as defined in claim 6 wherein said first predetermined relationship is 4 times said scaling factor and wherein said second predetermined relationship is 2 times said scaling factor.

* * * * *